(12) United States Patent
Lawson et al.

(10) Patent No.: US 10,691,868 B1
(45) Date of Patent: Jun. 23, 2020

(54) PROCESS FOR ANALYZING PRINTED CIRCUIT BOARD AND PACKAGING MANUFACTURING DESIGN RULES

(71) Applicant: Cadence Design Systems, Inc., San Jose, CA (US)

(72) Inventors: Randall Scott Lawson, Durham, NH (US); Utpal Bhattacharyya, Noida (IN); Edward B. Acheson, Chelmsford, MA (US); Robert Roesler, Fitzroy Harbour (CA)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/126,734

(22) Filed: Sep. 10, 2018

(51) Int. Cl.
   *G06F 30/398* (2020.01)
   *G05B 19/4097* (2006.01)
   *G06F 30/36* (2020.01)
   *G06F 113/18* (2020.01)

(52) U.S. Cl.
   CPC ....... *G06F 30/398* (2020.01); *G05B 19/4097* (2013.01); *G06F 30/36* (2020.01); *G06F 2113/18* (2020.01)

(58) Field of Classification Search
   USPC ........................................................ 716/52
   See application file for complete search history.

(56) References Cited

U.S. PATENT DOCUMENTS

| | | | |
|---|---|---|---|
| 8,249,736 B2 * | 8/2012 | Kelley | H05K 3/4638 438/614 |
| 2004/0010766 A1 * | 1/2004 | Swope | G06F 17/5068 716/112 |
| 2017/0249410 A1 * | 8/2017 | Baker | G06F 30/367 |

* cited by examiner

*Primary Examiner* — Eric D Lee
(74) *Attorney, Agent, or Firm* — Mark H. Whittenberger, Esq.; Holland & Knight LLP

(57) ABSTRACT

The present disclosure relates to a system and method for use in an electronic circuit design. Embodiments may include an electronic computer aided design ("CAD") system configured to receive one or more design rules and to receive one or more manufacturing rules. The CAD system may be further configured to analyze design database objects from the electronic design with respect to the manufacturing rules. The CAD system may generate a manufacturing output file, based upon, at least in part, the analyzing. Embodiments may also include a signoff computer aided manufacturing ("CAM") station configured to receive the manufacturing output file. The CAM station may be configured to attempt to validate the manufacturing output file.

17 Claims, 11 Drawing Sheets

PROCESS FOR ANALYZING PRINTED CIRCUIT BOARD AND PACKAGING MANUFACTURING DESIGN RULES

FIELD OF THE INVENTION

The present disclosure relates to electronic design automation (EDA), and more specifically, to a method for analyzing manufacturing design rules in an electronic design.

DISCUSSION OF THE RELATED ART

EDA utilizes software tools that may be used in the design and analysis of numerous electronic systems such as printed circuit boards (PCBs) and integrated circuits (ICs). Recent years have seen unprecedented expansion of functional requirements for PCB designs. PCB designers must now cope with a myriad of interconnect topologies and logic signal levels, and must be constantly keen to tolerance stack-up and to implications to signal integrity of an evolving placement/interconnect solution. Designers must balance dozens of variables that may resolve into hundreds of valid and invalid solutions without any real guidance from the available tools toward selecting the best solution. EDA customers have responded to these shortcomings by demanding more route engine power, interactive functionality and diverse capabilities from their CAD tools. Currently, most users solve difficult routing problems interactively through a manual CAD editing environment according to a tedious manual process.

Currently, when designing PCBs or Packages (e.g., system in package, multi-chip module, etc.), the design software does not contain the necessary rules to meet manufacturing requirements. Traditionally, manufacturing checks are performed on manufacturing output files. The designer must check their design for manufacturing issues using manufacturing verification software and then fix those issues using their design software and repeat the cycle. Problems found early in design cycle are much easier to fix then problems found after design is thought to be complete. This methodology requires multiple iterations between design and verification software which increases design development cycle. Existing manufacturing rules are batch and are not online. This is a result of the computational and memory intensive nature of these rules.

In existing systems, the process of designing and releasing a PCB or Package involves multiple steps and iterations. A designer may utilize electronic or mechanical (ECad/MCad) tools to lay out and edit the design. The designer may then create and output manufacturing data used to build the design. Manufacturing may then use the data, extensive set of rules and special software (signoff cam station) to validate the data produced by the PCB/Package system meets manufacturing requirement. Issues may be sent back to PCB/Package tools and next iteration begins (multiple iterations are common). These iterations take time and cause delays in releasing product. Accordingly, designers may not know that they are causing manufacturing issues during design process. In fact, designers may even cause new manufacturing issues when fixing a reported one. A such, fixing issues on an almost completed design can be very costly. These existing systems are performed this way as design systems do not contain design for manufacturing rules.

SUMMARY

In one or more embodiments of the present disclosure, a computer-implemented method for electronic circuit design is provided. The method may include providing an electronic computer aided design ("CAD") system, receiving one or more design rules associated with an electronic design at the electronic CAD system, and receiving one or more manufacturing rules associated with an electronic design at the electronic CAD system. The method may further include analyzing one or more design database objects from the electronic design with respect to the one or more manufacturing rules. The method may also include generating a manufacturing output file, based upon, at least in part, the analyzing and providing the manufacturing output file to a signoff computer aided manufacturing ("CAM") station. The method may also include attempting to validate the manufacturing output file at the signoff CAM station.

One or more of the following features may be included. In some embodiments, the method may include storing the one or more manufacturing rules at the electronic CAD system. A first set of the one or more manufacturing rules may be associated with a first stackup and a second set of the one or more manufacturing rules are associated with a second stackup. Analyzing may include batch processing and/or textual analysis. Analyzing may be performed prior to generating the manufacturing output file. The signoff CAM station may be located at a manufacturing facility.

In some embodiments, a computer-readable storage medium for electronic design is provided. The computer-readable storage medium may have stored thereon instructions that when executed by a machine result in one or more operations. Operations may include providing an electronic computer aided design ("CAD") system, receiving one or more design rules associated with an electronic design at the electronic CAD system, and receiving one or more manufacturing rules associated with an electronic design at the electronic CAD system. Operations may further include analyzing one or more design database objects from the electronic design with respect to the one or more manufacturing rules. Operations may also include transforming the one or more design database objects into a manufacturing output file, based upon, at least in part, the analyzing and providing the manufacturing output file to a signoff computer aided manufacturing ("CAM") station. Operations may also include attempting to validate the manufacturing output file at the signoff CAM station.

One or more of the following features may be included. In some embodiments, operations may include storing the one or more manufacturing rules at the electronic CAD system. A first set of the one or more manufacturing rules may be associated with a first stackup and a second set of the one or more manufacturing rules are associated with a second stackup. Analyzing may include batch processing and/or textual analysis. Analyzing may be performed prior to generating the manufacturing output file. The signoff CAM station may be located at a manufacturing facility.

In one or more embodiments of the present disclosure, a system is provided. The system may include an electronic computer aided design ("CAD") system. The CAD system may be configured to receive one or more design rules associated with an electronic design at the electronic CAD system and to receive one or more manufacturing rules associated with an electronic design at the electronic CAD system. The CAD system may be further configured to analyze one or more design database objects from the electronic design with respect to the one or more manufacturing rules. The CAD system may be further configured to transform the one or more design database objects into a manufacturing output file, based upon, at least in part, the analyzing. The system may include a signoff computer aided manufacturing ("CAM") station configured to receive the manufacturing output file, the signoff CAM station further configured to attempt to validate the manufacturing output file at the signoff CAM station.

One or more of the following features may be included. In some embodiments, the system may store the one or more manufacturing rules at the electronic CAD system. A first set of the one or more manufacturing rules may be associated with a first stackup and a second set of the one or more manufacturing rules are associated with a second stackup. Analyzing may include batch processing and/or textual analysis. Analyzing may be performed prior to generating the manufacturing output file. The system may display the transformed design database objects, upon a user's selection in a user interface.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
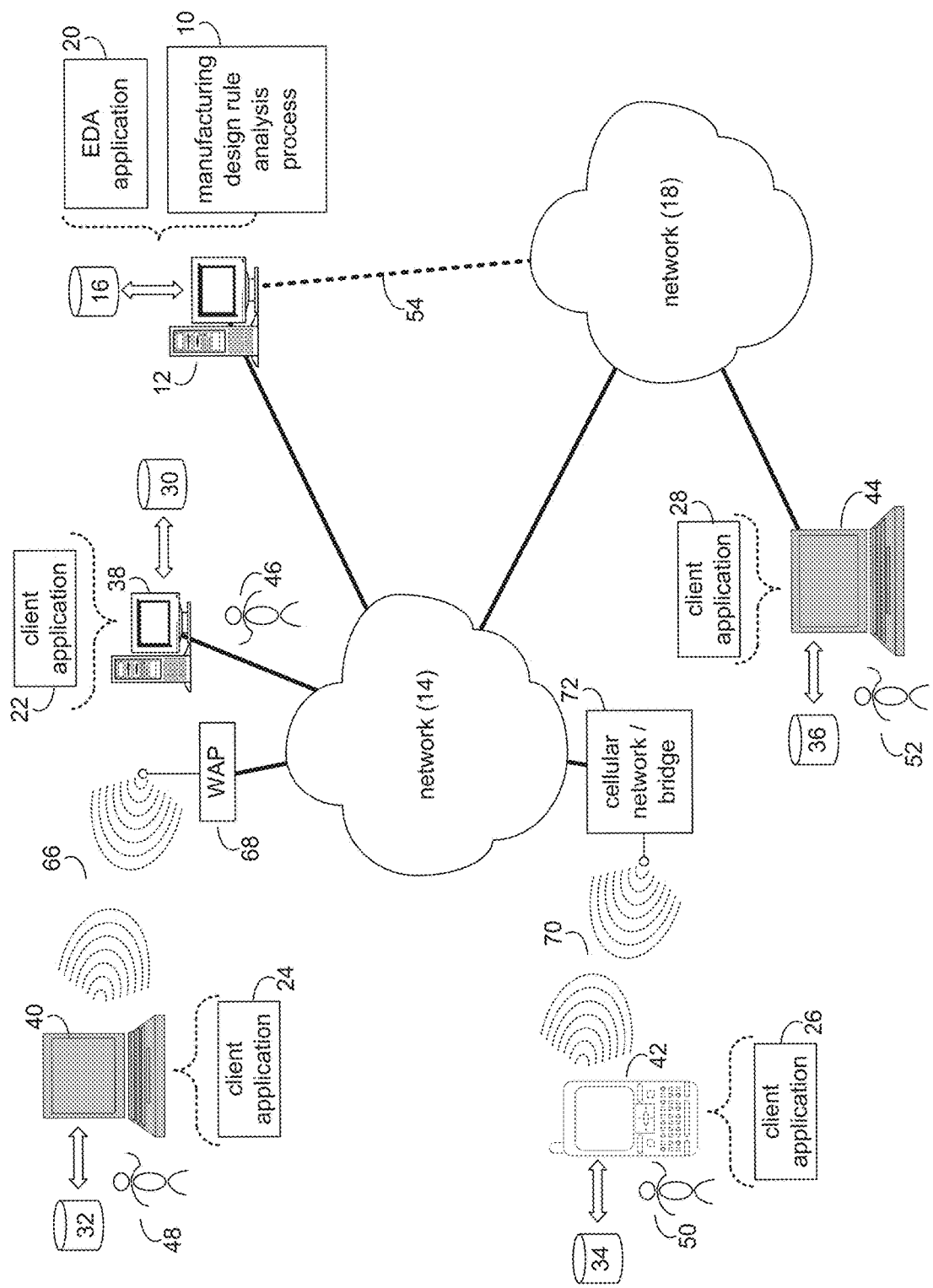
FIG. 1 is a system diagram depicting aspects of the manufacturing design rule analysis process in accordance with an embodiment of the present disclosure.

Referring to FIG. 1, there is shown manufacturing design rule analysis process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the manufacturing design rule analysis process may reside on and be executed, in whole or in part, by a client electronic device, such as a personal computer, notebook computer, personal digital assistant, or the like.

The instruction sets and subroutines of manufacturing design rule analysis process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Manufacturing design rule analysis process 10 may be a stand alone application, or may be an applet/application/script that may interact with and/or be executed within EDA application 20. In addition/as an alternative to being a server-side process, the manufacturing design rule analysis process may be a client-side process (not shown) that may reside on a client electronic device (described below) and may interact with an EDA client application (e.g., one or more of EDA client applications 22, 24, 26, 28). Further, the manufacturing design rule analysis process may be a hybrid server-side/client-side process that may interact with EDA application 20 and an EDA client application (e.g., one or more of client applications 22, 24, 26, 28). As such, the manufacturing design rule analysis process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize manufacturing design rule analysis process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14. In some embodiments, manufacturing design rule analysis process 10 may be a cloud-based process as any or all of the operations described herein may occur, in whole, or in part, in the cloud or as part of a cloud-based system.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
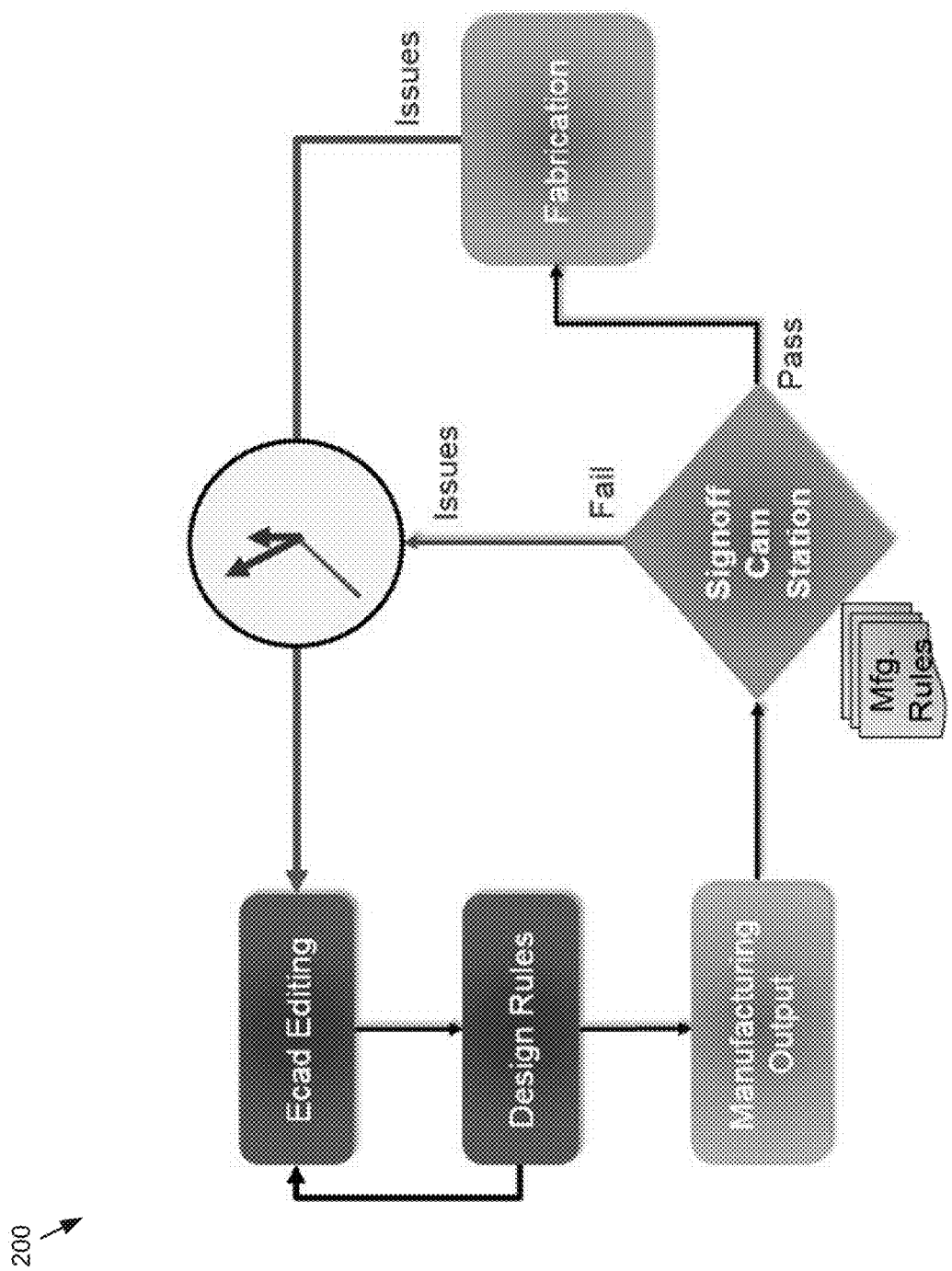
FIG. 2 shows a schematic of an existing approach for handling manufacturing design rules.

Referring now to FIG. 2, in some existing systems an external Cam station may be used to validate one or more electronic designs. These Cam stations may validate manufacturing outputs based on a set or sets of rules. Some Cam stations support the ability to batch load Cam station design rule checks ("DRC") into Ecad systems for display Any issues identified at the Cam station needs to be sent back and fixed in the PCB system. This type of arrangement requires a user to generate all the manufacturing output before sending to manufacturing, which is extremely time consuming. The checking performed in these types of systems is not performed in real-time. For example, in some situations a user may complete the design and believe that they have completed the task. However, later they may receive results from the Cam station (often days later) and realize many changes are necessary. Changes made late in the cycle are much more expensive, in the way of time, to fix than fixing at time of creation. Moreover, the manufacturing validation engineer is generally a different person than the designer.

Cam Stations may support many design rules but few manufacturing rules and in many cases it is not always clear as to what are strictly design rules vs strictly manufacturing rules. For example, a track to track rule for a diffpair may be very different from a track to track rule for a non diffpair, which may be very different from a track to track manufacturing rule. Design rules are more about the function of the design at runtime vs manufacturing rules are about the building of the bareboard and assembly and test of the design.

Figure 3:
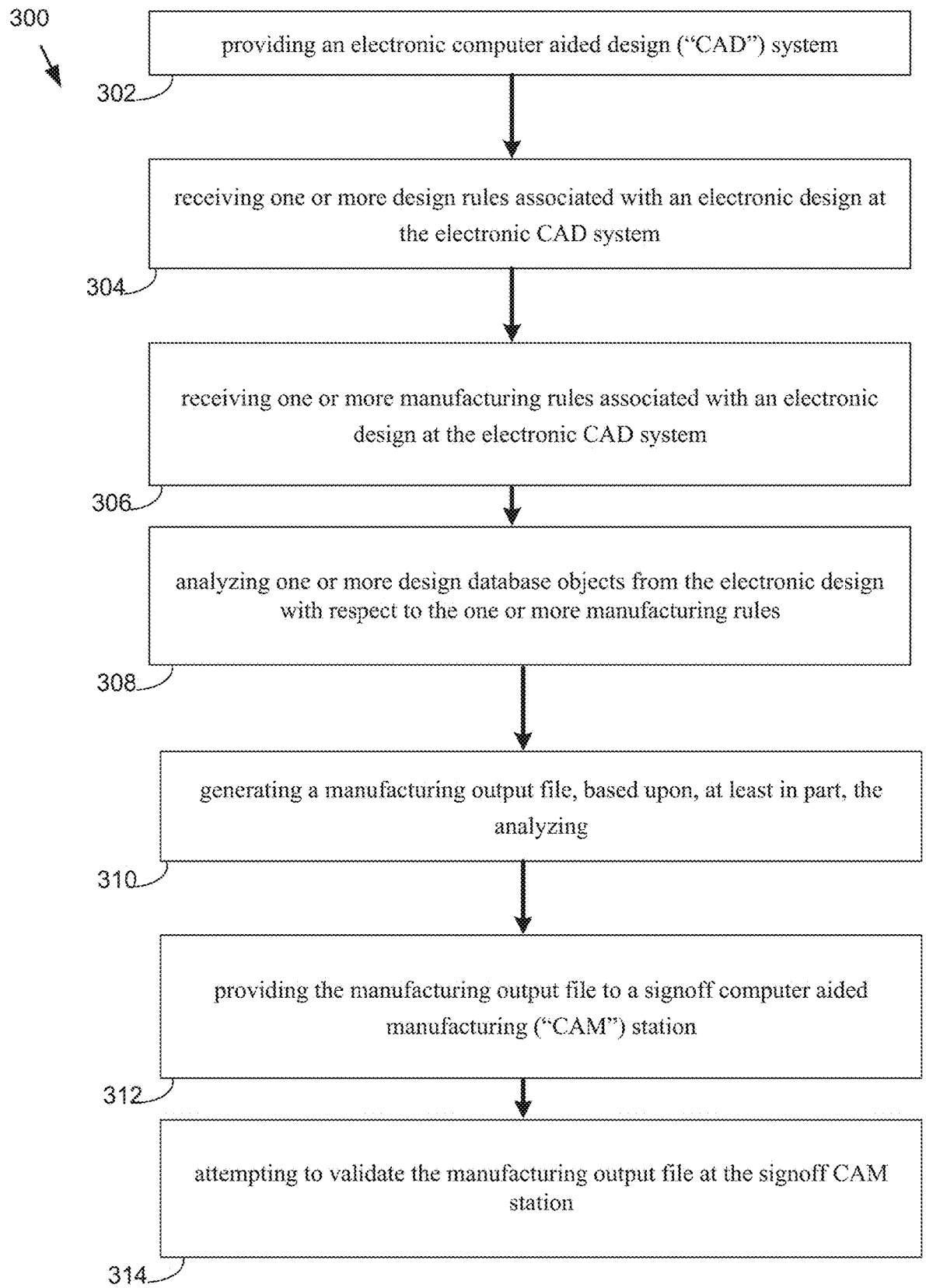
FIG. 3 is a flowchart depicting operations consistent with the manufacturing design rule analysis process of the present disclosure.

As shown in FIG. 3, and as will be discussed in further detail below, manufacturing design rule analysis process 10 may include providing 302 an electronic computer aided design ("CAD") system, receiving 304 one or more design rules associated with an electronic design at the electronic CAD system, and receiving 306 one or more manufacturing rules associated with an electronic design at the electronic CAD system. The method may further include analyzing

308 one or more design database objects from the electronic design with respect to the one or more manufacturing rules. The method may also include generating 310 a manufacturing output file, based upon, at least in part, the analyzing and providing 312 the manufacturing output file to a signoff computer aided manufacturing ("CAM") station. The method may also include attempting 314 to validate the manufacturing output file at the signoff CAM station.

Figure 4:
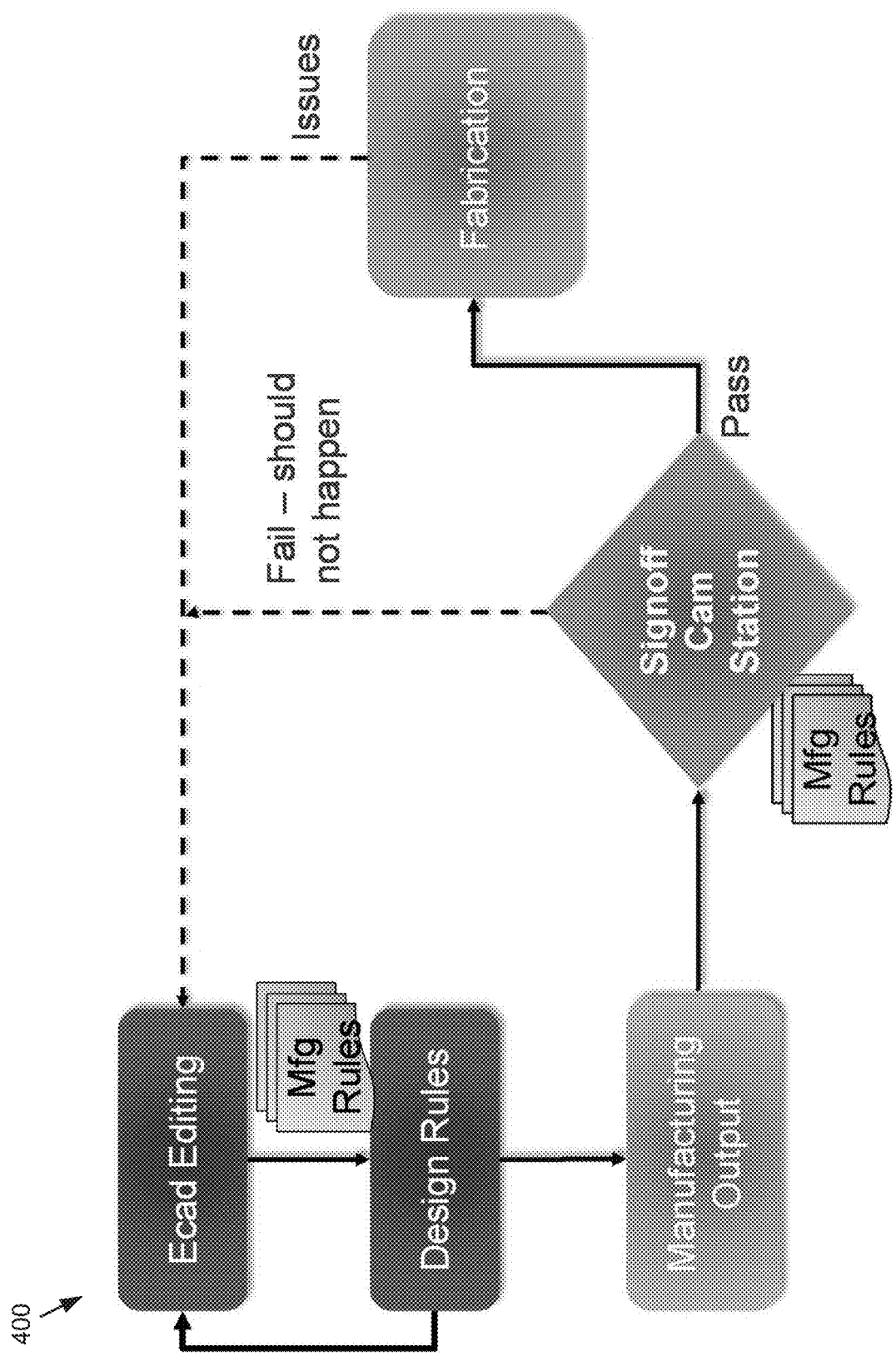
FIG. 4 is a schematic depicting aspects of the manufacturing design rule analysis process in accordance with an embodiment of the present disclosure.

Accordingly, and referring also to FIG. 4, embodiments of manufacturing design rule analysis process 10 be configured to move some or all of the manufacturing rules into the design cycle at the same point as the design rules. These manufacturing rules may be different in different stackups of the design. In some embodiments, users may be able to visualize manufacturing violations after each interactive change similar to what occurs for design violations. Fixing manufacturing violations at time of creation is always easier and quicker than after the design is thought to be done.

In some embodiments, manufacturing design rule analysis process 10 may provide an easy method of organizing and swapping in new manufacturing rules from additional manufacturing facilities. In this way, the teachings of the present disclosure may allow for a reduction in cycles from design->signoff->manufacturing to one cycle.

In some embodiments, manufacturing design rule analysis process 10 may provide a PCB/Packaging design system that is configured to support internal storage of extensive set of manufacturing rules. These rules may be in different zones (e.g. different stackups). Embodiments of manufacturing design rule analysis process 10 may support batch checking of an extensive set of manufacturing rules. Accordingly, process 10 may support true online checking of an extensive set of manufacturing rules as is discussed in further detail below. True online checking may refer to a situation where the checking analysis process is based on the actual rule used in manufacturing to detect any violation in real time.

Figure 5:
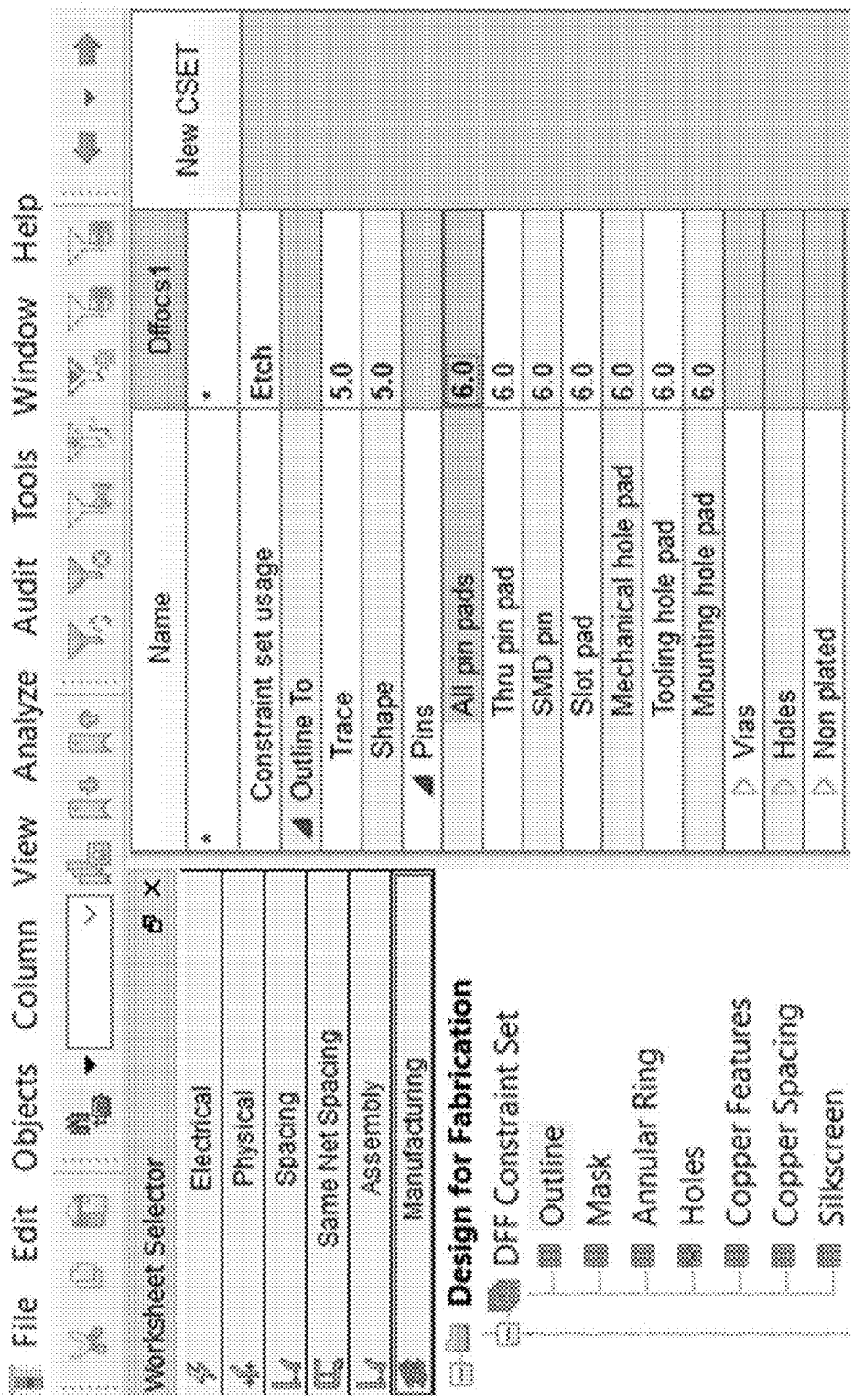
FIG. 5 is a graphical user interface depicting aspects of the manufacturing design rule analysis process in accordance with an embodiment of the present disclosure.
Figure 6:
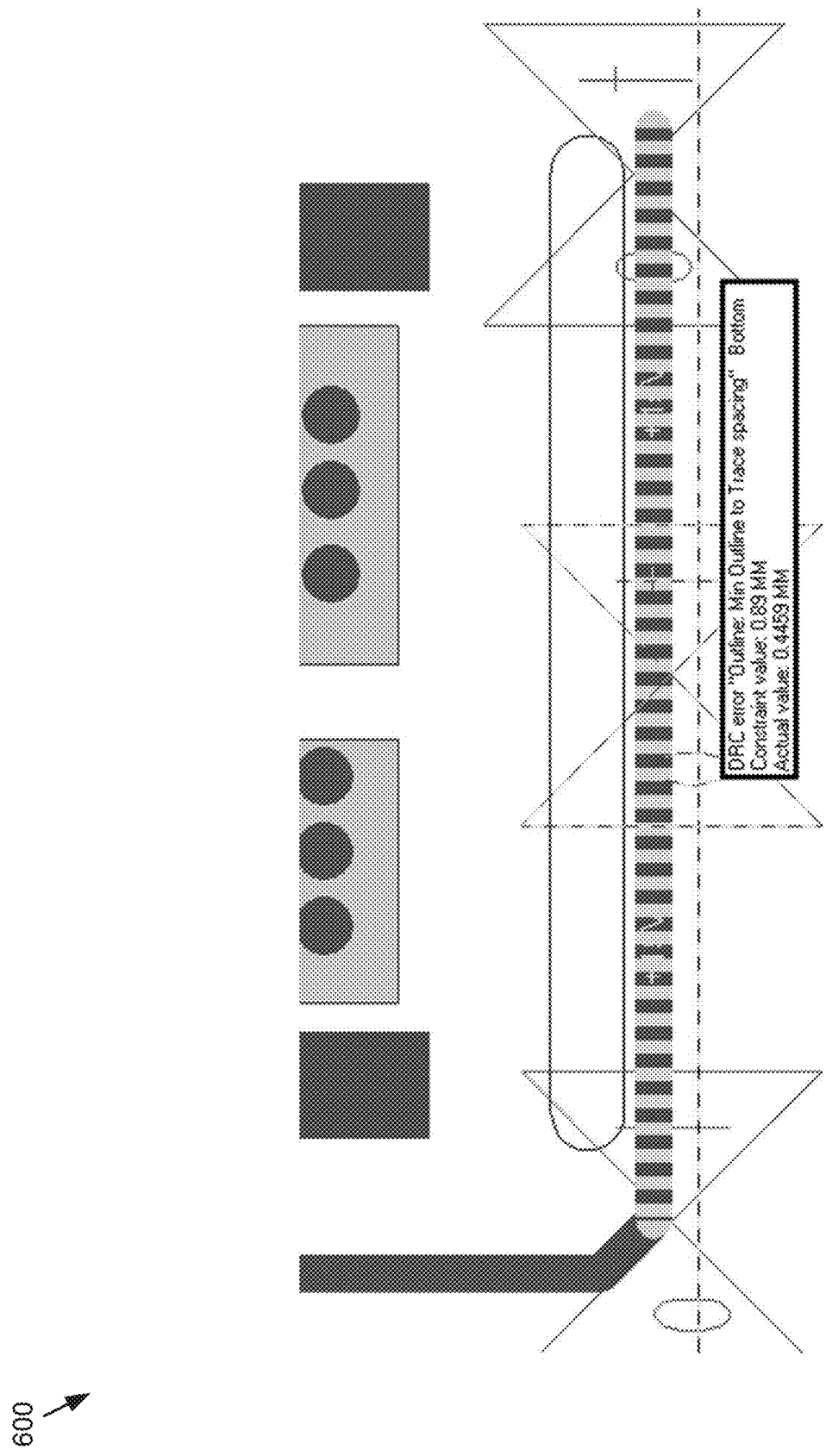
FIG. 6 is a graphical user interface depicting aspects of the manufacturing design rule analysis process in accordance with an embodiment of the present disclosure.
Figure 7:
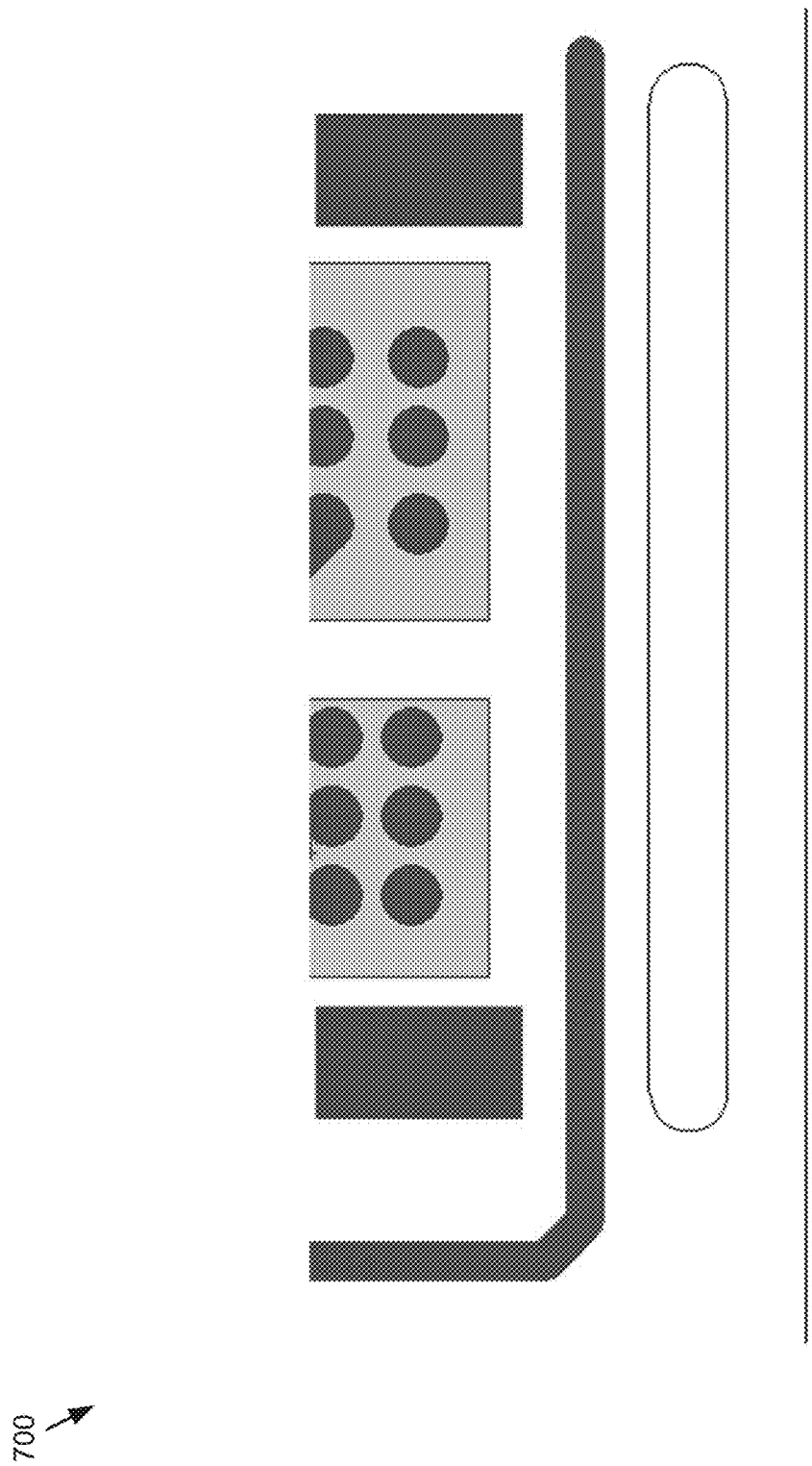
FIG. 7 is a graphical user interface depicting aspects of the manufacturing design rule analysis process in accordance with an embodiment of the present disclosure.

Referring now to FIGS. 5-7, embodiments consistent with manufacturing design rule analysis process 10 are provided. FIG. 5 depicts an example graphical user interface 500 that may be used in accordance with the present disclosure. GUI 500 shows an example of a constraint manager that may be used to define one or more design for manufacturing rules. FIGS. 6-7 show examples of graphical user interfaces. For example, FIG. 6 depicts an example where a user may edit the electronic design and one or more design for manufacturing violations may appear on the GUI 600. FIG. 7 shows a similar flow.

In some embodiments, some of the manufacturing rules may include, but are not limited to those discussed below. Fabrication Outline to all objects on the electronic design (100+ rules). A fabrication outline check may include a PCB Outline to conductive or non conductive elements that may cause interference in the PCB fabrication and PCB Assembly process. Failure to identify these issues will result in costly low yield and product functional failure. These checks are very important both to bareboard fabrication and assembly. Fabrication Mask checks (20+ rules), which may be very compute and memory intensive and do not exist in PCB/Packaging design systems or exist as a batch check only. A Fabrication Mask checks may include ensuring that minimum requirements to ensure mask adhesion property requirements are met, and proper coverage of masking material to reduce or eliminate the risk of electronics circuits exposure to the natural elements, and provide correct characteristics for the attachment of electronic complete to the PCB. Fabrication Annular ring checks (80+), which do not exist in PCB/Package design systems today. A Fabrication Annular ring check may include a validation rule that defines the acceptable relational values of conductor plane clearances, conductor plane connections and correct surface area for electronic component attachment, and relational drill hole to conductive pad for plating purposes. Fabrication Hole checks (10+ rules), which are not something that a designer thinks about or worries about when laying out design but will be a big issue at manufacturing time. A Fabrication Hole Checks may relate to determining the proper clearances of holes in a PCB to other conductive and non-conductive object on the PCB to prevent fabrication issues and unintentional shorting of electronic circuits. Fabrication Copper Feature Checks (80+ rules), which can be very compute and memory intensive and also do not exist in PCB/Packaging design systems or exist as a batch check only. Fabrication Copper Feature Checks may relate to all conductive feature minimum and maximum size characteristic to ensure proper clearances and current carrying load to prevent unintentional sorting of circuits and current load. Fabrication Copper Spacing (400+ rules), which may be the rules that have the most overlap with Design rules, however spacing for Design is often about runtime functionality not manufacturing. Fabrication Copper Spacing checks may be used to validate that conducive materials maintain minimum clearance size characteristics to ensure proper fabrications process to prevent the unintentional sorting of circuits as well as the unintentional breaking of circuits in a PCB. Fabrication Silkscreen checks (50+ rules), which are all about manufacturing and for the most part have never existed in PCB/Package design systems. Fabrication Silkscreen checks may relate to silkscreen in nomenclature clearances to detect legibility and proper clearances from conducive materials that would interfere with the assembly and circuit testing processes of a PCB product. Assembly Outline checks (10+ rules), which have never existed in design systems and are a common mistake for customers. Assembly outline checks which may be used for the verification of clearances from the PCB boundary to components placed on the PCB to prevent PCB assembly process interferences and final assembly of product into a system. Checking like components including height to the edge of design, large pin count devices to the edge of design and many more. Assembly Package to Package checks (20+ rules). Many checks are done with respect to distances of packages from one another along with orientation. Some of these exist in CAD design systems as batch only checks. Assembly Package to Package checks (20+ rules)-many checks are done with respect to distances of packages from one another along with orientation. Some of these exist in PCB/Package design systems as batch only checks. Assembly Package to Package checks may relate to the spacing requirements to avoid components from interfering with each other during automated or manual placement processes. Assembly Component Lead checks (20+ rules)-these rules are based on the actual physical purchased part and how they align with the features on the design. These do not exist in PCB/Package design systems today. Assembly component lead checks may involve the validation that minimum/maximum requirements are met for the electrical component lead maintains adequate contact area on the PCB conductive pads and holes. Assembly Spacing (30+ rules), which checks various types of spacing between component bodies and holes and traces and fiducials. Not found in existing PCB/Package designs systems. Assembly Pastemask checks (10+ rules), which may check for existence of pastemask and appropriate size and distance from other masks. These checks ensure that minimum requirements are met to ensure the pastemask material volume is adequate for correct adhesion of a component lead to a conductive pad. Assembly Fiducial checks (2 rules), which may check for existence and minimum count of component fiducials. Assembly Fiducial Checks may ensure that minimum requirements for the number of fiducials (optical registrations points) and proper clearances for automated assembly and test systems. Design for Tests checks (35+ rules). Traditional design for manufacturing ("DFM") checks are performed using PCB artwork files generated from the PCB Design and an external DFM Checker. If there is an issue in a library part that has 200 instantiations in the design, it would report 200 issues. Since these checks are only done at the end of the design cycle, they would require fixing and re-outputting the PCB artwork files for the external DFM Checker.

Embodiments consistent with manufacturing design rule analysis process 10 may also support performing online DFM checks on individual Library parts. Accordingly, a designer may be allowed to fix any issue at the library part level before ever instantiating the part on the PCB Design. As such, the 200 issues from above would never exist on the PCB Design. It would have been one issue found at Library part creation time.

ECAD systems generally include one or more constraints and when a designer specifies the constraints a value may be assigned for layer(s). Since different PCB Designs have different stackups, the designer must redefine all these values in the next design, which is not an ideal reuse model.

Accordingly, in some embodiments, manufacturing design rule analysis process 10 may allow for the definition of rules and values without regard to layer(s) (e.g., based copper weight, etc.). These may be saved in files and reused in any design that has a layer(s) with matching copper weight. As such, a designer may now quickly read in the required rulesets and assign them to the layers they are intended for. This eliminates any need to define individual values for each layer.

Figure 8:
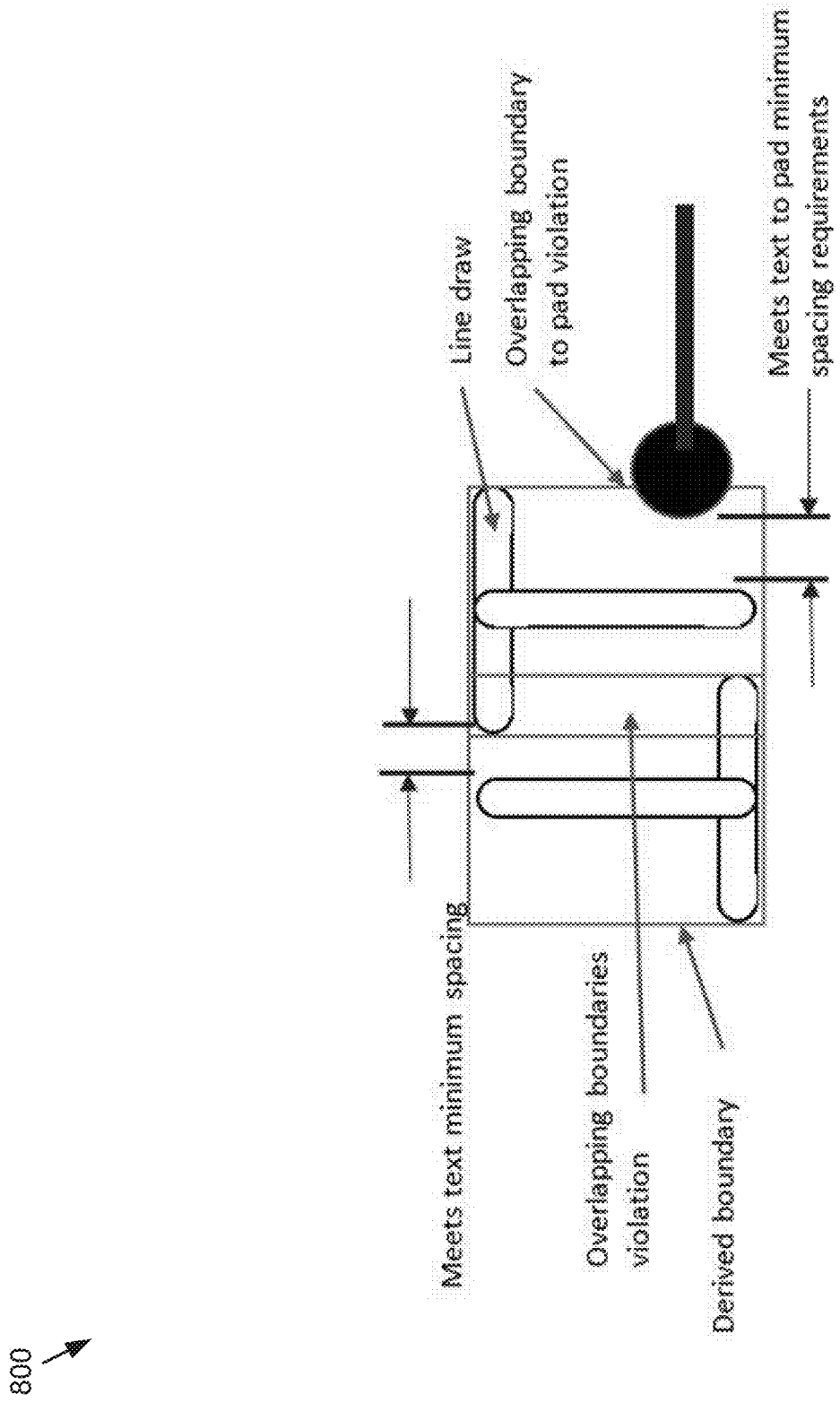
FIG. 8 is a schematic depicting aspects of the manufacturing design rule analysis process in accordance with an embodiment of the present disclosure.

Referring now to FIG. 8, another example consistent with manufacturing design rule analysis process 10 is provided. Traditional copper text geometry checks, where checks are performed to detect potential shorts between signal copper geometry and copper text geometry, is based on simple line draws in PCB artwork data. These line draws are unintelligent graphics with no text identifiers, so the current tools must make a best attempt to identify such geometries as text. Rules for copper text to other copper geometries, and other text are limited or non-existent. For those tools that can derive text, the typical checks are to a derived bounding box around the text and check to the bounding box instead of the text geometry itself. The text boundary check scenario can produce false errors as shown in FIG. 8. The individual line draws for text also limit the ability to distinguish text line element widths from other line widths. Specific minimum width checks for text lines may have allowable difference from other lines, but do to the limitations of proper text recognition, these differences cannot be defined. These limitations have an impact on board design where spacing is a concern. The derived boundaries have the potential of using up valuable space on the PCB board.

In some embodiments, manufacturing design rule analysis process 10 may be configured to examine the text defined in the design database as actual text. This allows the DFM checks to examine each of the elements that make up a character checking specifically the text element to other objects and not the overlying extents. This feature allows a designer to take advantage of as much useable space as possible on the PCB. This capability of understanding actual text construction also allows the distinction of text lines from other line objects within the design, resulting in the less time wasted on examining inaccurately reported issues.

In some cases, multiple layers are output to represent artwork which is used by external DFM checkers (e.g. in annular ring checks, etc.). They must process the multiple layers and combine them in such a way to understand the usage to determine if the correct representation was output. Standard artwork files do not contain netlist information. Newer formats like ODB++ and IPC-2581 do contain the netlist information. The external DFM checker software must read the netlist, read all the layers and then try to derive what is really intended. Misinterpretation of this data often results in missing real errors, or reporting false errors. These errors are costly in both time and money in both the OEM and the fabricator.

Accordingly, in some embodiments, manufacturing design rule analysis process 10 may be configured to intelligently understand what is intended and may check for the correct representation. Having the actual structures in the design eliminates the need to derive intent resulting in real error identification, design structure intent, eliminating misinterpretation, cost to the fabricator and time to release for the OEM.

Figure 9:
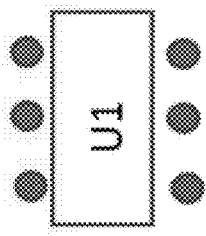
FIG. 9 is a schematic depicting aspects of the manufacturing design rule analysis process in accordance with an embodiment of the present disclosure.
Figure 9:
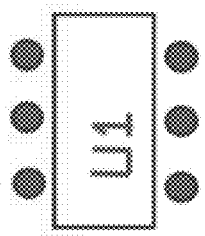

Referring now to FIG. 9, an example depicting silkscreen reference designator checks is provided. Identifying the difference between a line and a piece of text provides the ability to verify that the reference designator is not under a component. Since the external DRC checkers see text as line draws, these checkers cannot distinguish the line draws that represent just a line from the ones that really represent text and more specifically a reference designator.

Accordingly, in some embodiments, manufacturing design rule analysis process 10 may be configured to intelligently understand that it is text and more specifically reference designator text and can be checked for being under a component. For example, a Vector Draw Method would not detect Silkscreen under a component whereas the embodiments included herein may understand the text as intelligent text and detects it is under the component.

Figure 10:
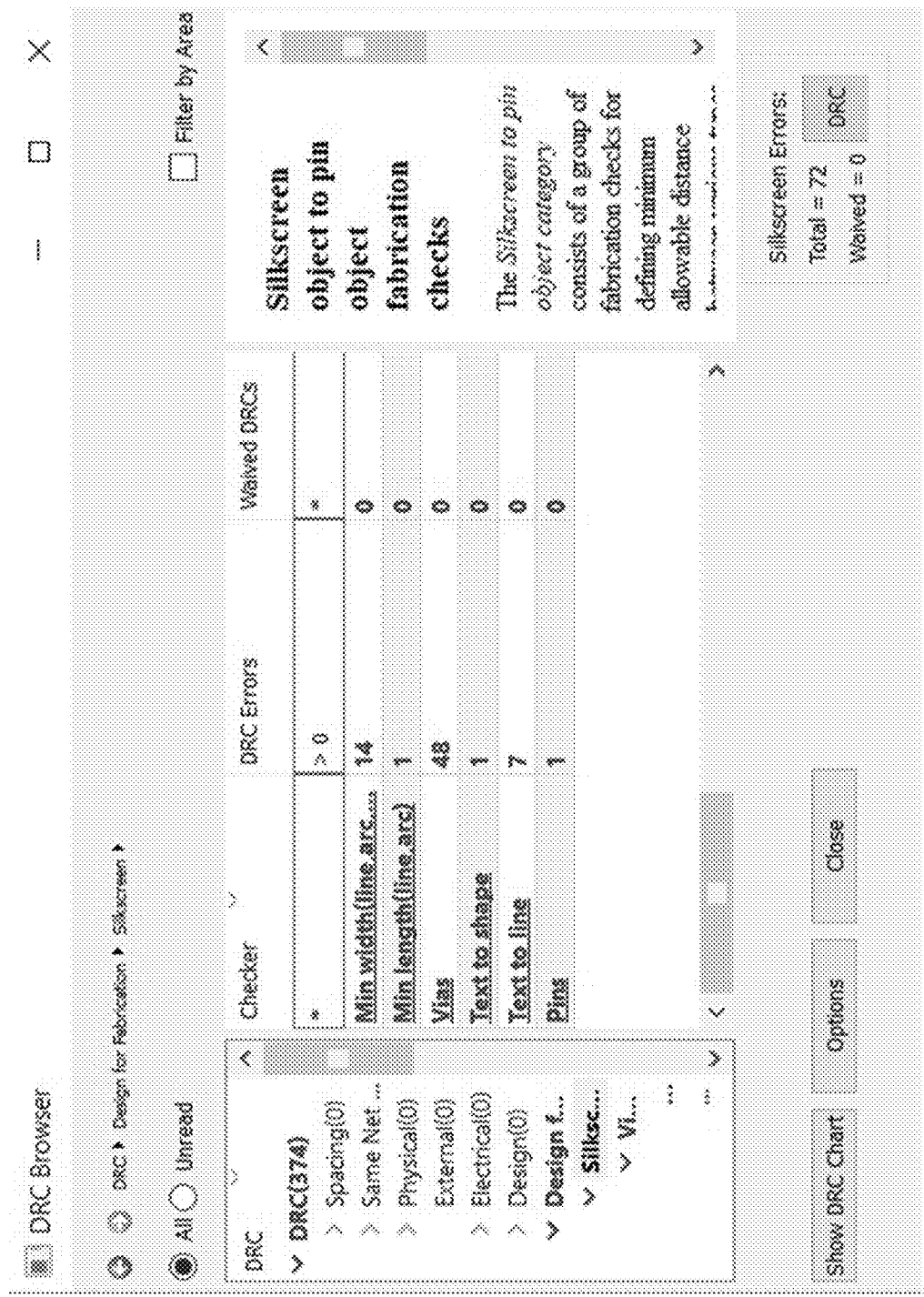
FIG. 10 is a graphical user interface depicting aspects of the manufacturing design rule analysis process in accordance with an embodiment of the present disclosure.
Figure 11:
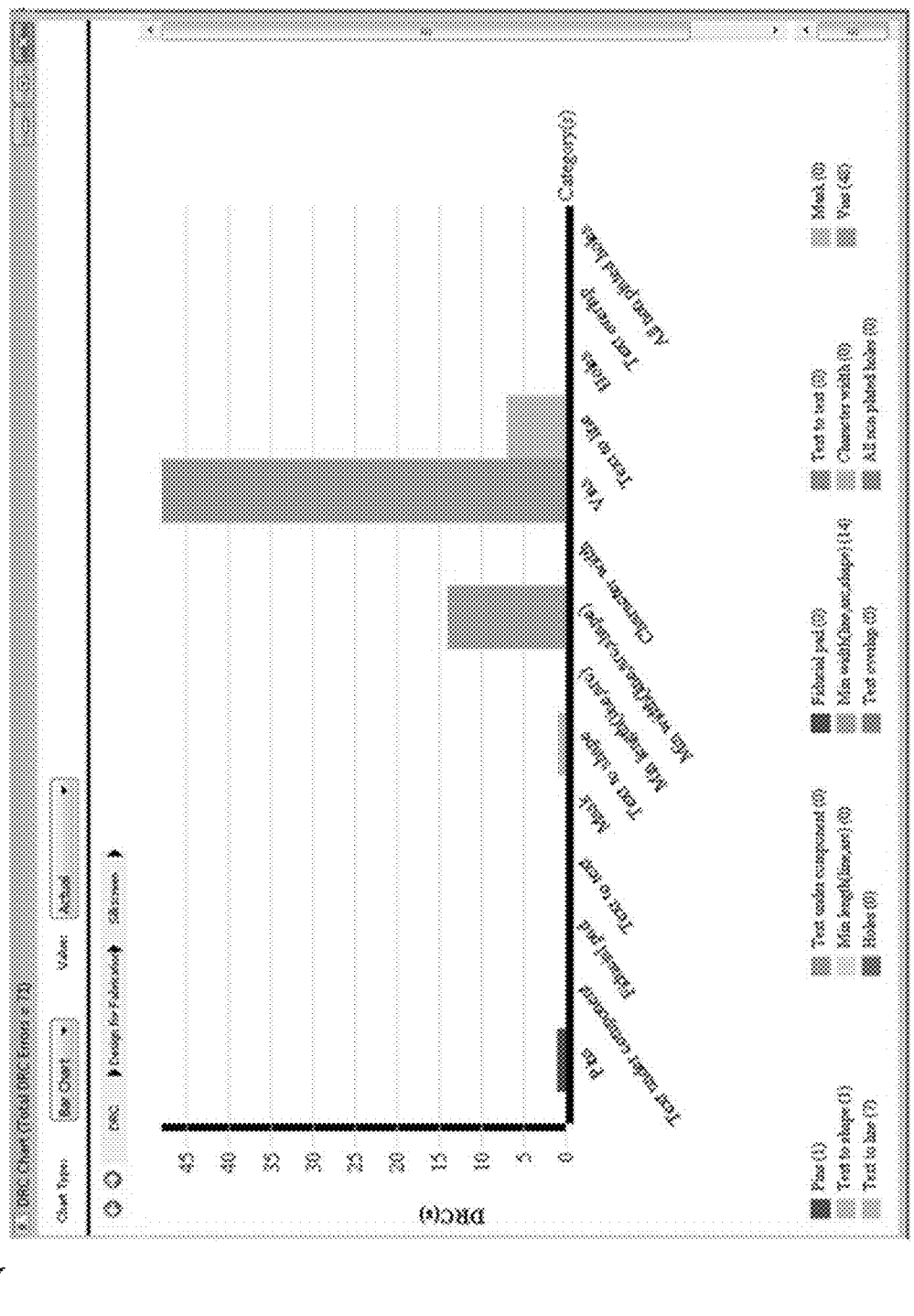
FIG. 11 is a graphical user interface depicting aspects of the manufacturing design rule analysis process in accordance with an embodiment of the present disclosure.

Referring now to FIG. 10, an embodiment of a graphical user interface 1000 is provided. GUI 1000 shows a design rule checking browser. This browser may provide an efficient way to visualize and/or filter the huge quantity of new DRC checks. FIG. 11 shows a GUI 1100 depicting a DRC chart and the specifics regarding the particular errors uncovered with regard to silkscreen. This example shows 71 errors, in this example, with the largest contributor being the vias.

Accordingly, embodiments of manufacturing design rule analysis process 10 may provide numerous advantages over existing solutions. A paradigm shift is provided from verification for manufacturing to design for manufacturing. Embodiments included herein may check the actual design database objects as opposed to the manufacturing output files as had been done by prior systems. The text analysis described herein also provided advantages over a mere review of CAM station gerber files.

As discussed above, embodiments of manufacturing design rule analysis process 10 may be configured to transform one or more database objects into a manufacturing output file. In this way, process 10 may be configured to transform and/or enhance design files to incorporate/implement applicable manufacturing rules. Various graphical user interfaces have been shown and described, some or all of which may be used to allow for these transformations. For example, the graphical user interfaces shown in FIGS. 5 and 10 allow for a designer to select, edit, and/or alter inputs on the display itself. The display and subsequent transformation of data provided for in display 1000 enables a significant technological advancement in the field of electronic design. FIG. 11 furthers this advancement by providing a user-selectable chart that enables a display of results that were previously unavailable to designers. In light of the discussion of embodiments of the present disclosure, no features associated with manufacturing design rule analysis process 10 are believed to be well-understood, routine, or conventional to a person of ordinary skill in the field of electronic design.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

In some embodiments, EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
   providing an electronic computer aided design ("CAD") system;
   receiving one or more design rules associated with an electronic design at the electronic CAD system;
   receiving one or more manufacturing rules associated with an electronic design at the electronic CAD system, wherein the one or more manufacturing rules include at least one of fabrication outline checks, fabrication mask checks, fabrication annular ring checks, fabrication hole checks, fabrication copper feature checks, fabrication copper spacing checks, fabrication silkscreen checks, assembly outline checks, assembly package checks, assembly package to package checks, assembly component lead checks, assembly spacing checks, assembly pastemask checks, assembly fiducial checks, and design for tests checks;
   analyzing one or more design database objects from the electronic design with respect to the one or more manufacturing rules, wherein analyzing includes textual analysis;
   generating a manufacturing output file, based upon, at least in part, the analyzing;
   providing the manufacturing output file to a signoff computer aided manufacturing ("CAM") station; and
   attempting to validate the manufacturing output file, which is based upon, at least in part, the one or more manufacturing rules, at the signoff CAM station.

2. The computer-implemented method of claim 1, further comprising:
   storing the one or more manufacturing rules at the electronic CAD system.

3. The computer-implemented method of claim 1, wherein a first set of the one or more manufacturing rules are associated with a first stackup and a second set of the one or more manufacturing rules are associated with a second stackup.

4. The computer-implemented method of claim 1, wherein analyzing includes batch processing.

5. The computer-implemented method of claim 1, wherein analyzing is performed prior to generating the manufacturing output file.

6. The computer-implemented method of claim 1, wherein the signoff CAM station is located at a manufacturing facility.

7. A computer-readable storage medium having stored thereon instructions that when executed by a machine result in the following operations:
   providing an electronic computer aided design ("CAD") system;
   receiving one or more design rules associated with an electronic design at the electronic CAD system;
   receiving one or more manufacturing rules associated with an electronic design at the electronic CAD system, wherein the one or more manufacturing rules include at least one of fabrication outline checks, fabrication mask checks, fabrication annular ring checks, fabrication hole checks, fabrication copper feature checks, fabrication copper spacing checks, fabrication silkscreen checks, assembly outline checks, assembly package checks, assembly package to package checks, assembly component lead checks, assembly spacing checks, assembly pastemask checks, assembly fiducial checks, and design for tests checks;
   analyzing one or more design database objects from the electronic design with respect to the one or more manufacturing rules;
   transforming the one or more design database objects into a manufacturing output file, based upon, at least in part, the analyzing;
   providing the manufacturing output file to a signoff computer aided manufacturing ("CAM") station; and
   attempting to validate the manufacturing output file, which is based upon, at least in part, the one or more manufacturing rules, at the signoff CAM station.

8. The computer-readable storage medium of claim 7, further comprising:
   storing the one or more manufacturing rules at the electronic CAD system.

9. The computer-readable storage medium of claim 7, wherein a first set of the one or more manufacturing rules are associated with a first stackup and a second set of the one or more manufacturing rules are associated with a second stackup.

10. The computer-readable storage medium of claim 7, wherein analyzing includes batch processing.

11. The computer-readable storage medium of claim 7, wherein analyzing is performed prior to generating the manufacturing output file.

12. The computer-readable storage medium of claim 7, wherein the signoff CAM station is located at a manufacturing facility.

13. A system comprising:
   an electronic computer aided design ("CAD") system, the CAD system configured to receive one or more design rules associated with an electronic design at the electronic CAD system and to receive one or more manufacturing rules associated with an electronic design at the electronic CAD system, wherein the one or more manufacturing rules include at least one of fabrication outline checks, fabrication mask checks, fabrication annular ring checks, fabrication hole checks, fabrication copper feature checks, fabrication copper spacing checks, fabrication silkscreen checks, assembly outline checks, assembly package checks, assembly package to package checks, assembly component lead checks, assembly spacing checks, assembly pastemask checks, assembly fiducial checks, and design for tests checks, the CAD system further configured to analyze one or more design database objects from the electronic design with respect to the one or more manufacturing rules, the CAD system further configured to transform the one or more design database objects into a manufacturing output file, based upon, at least in part, the analyzing; and a signoff computer aided manufacturing ("CAM") station configured to receive the manufacturing output file, the signoff CAM station further configured to attempt to validate the manufacturing output file, which is based upon, at least in part, the one or more manufacturing rules, at the signoff CAM station.

14. The system of claim 13, further comprising:
storing the one or more manufacturing rules at the electronic CAD system.

15. The system of claim 13, wherein a first set of the one or more manufacturing rules are associated with a first stackup and a second set of the one or more manufacturing rules are associated with a second stackup.

16. The system of claim 13, wherein analyzing includes batch processing.

17. The system of claim 13, wherein analyzing is performed prior to generating the manufacturing output file.

* * * * *